March 5, 1957 W. B. HERNDON, JR 2,783,620
REFRIGERATION SYSTEM

Filed April 19, 1954 9 Sheets-Sheet 1

INVENTOR.
William B. Herndon Jr.
BY
Robert H. Wendt
Atty.

March 5, 1957  W. B. HERNDON, JR  2,783,620
REFRIGERATION SYSTEM
Filed April 19, 1954  9 Sheets-Sheet 2
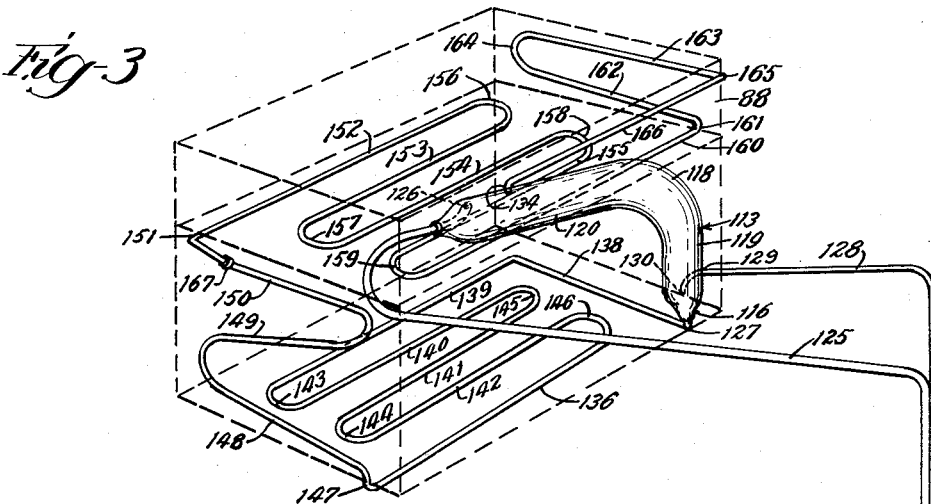
Fig-3
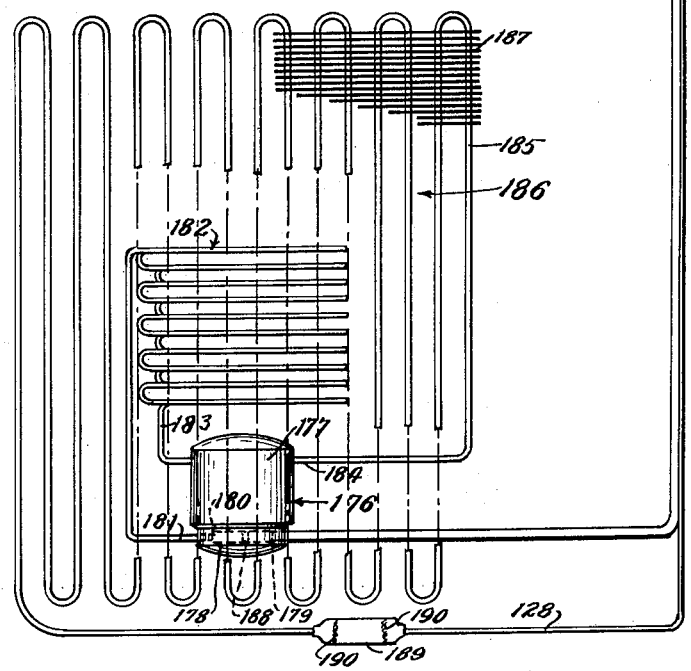
INVENTOR.
William B. Herndon Jr.
BY
Robert H. Wendt
Atty.

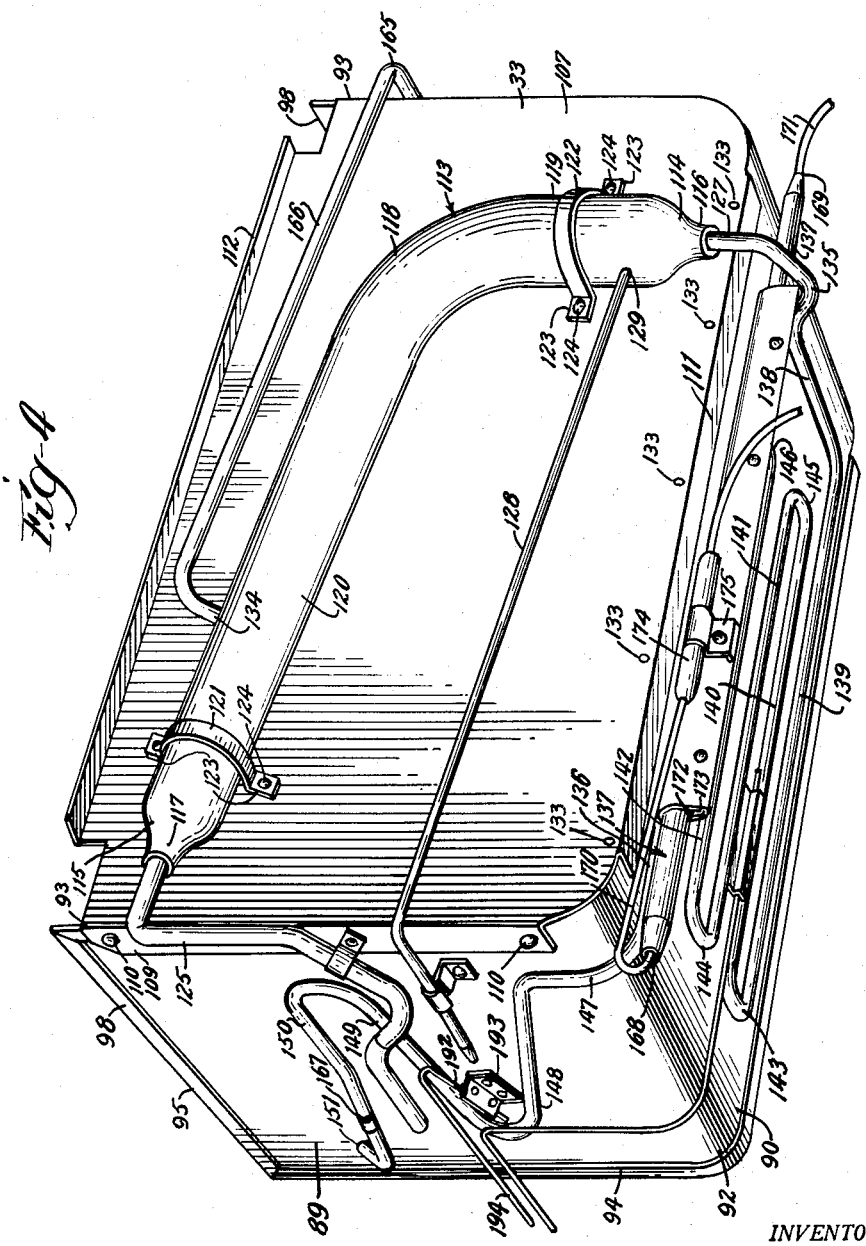

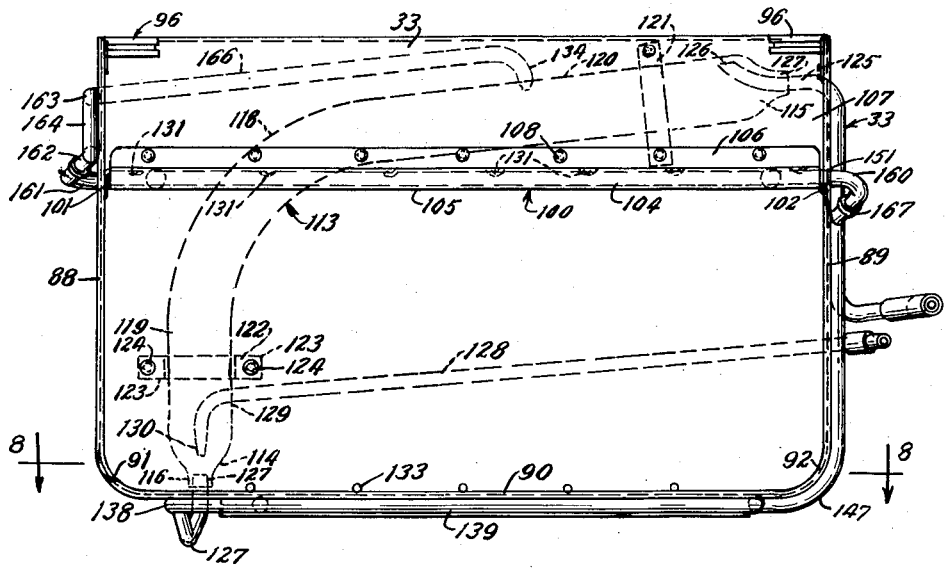
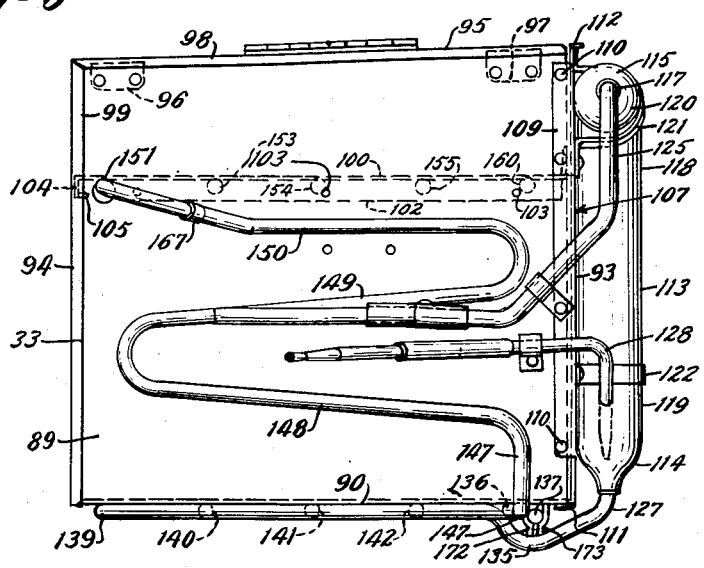

March 5, 1957 W. B. HERNDON, JR 2,783,620
REFRIGERATION SYSTEM
Filed April 19, 1954 9 Sheets-Sheet 5
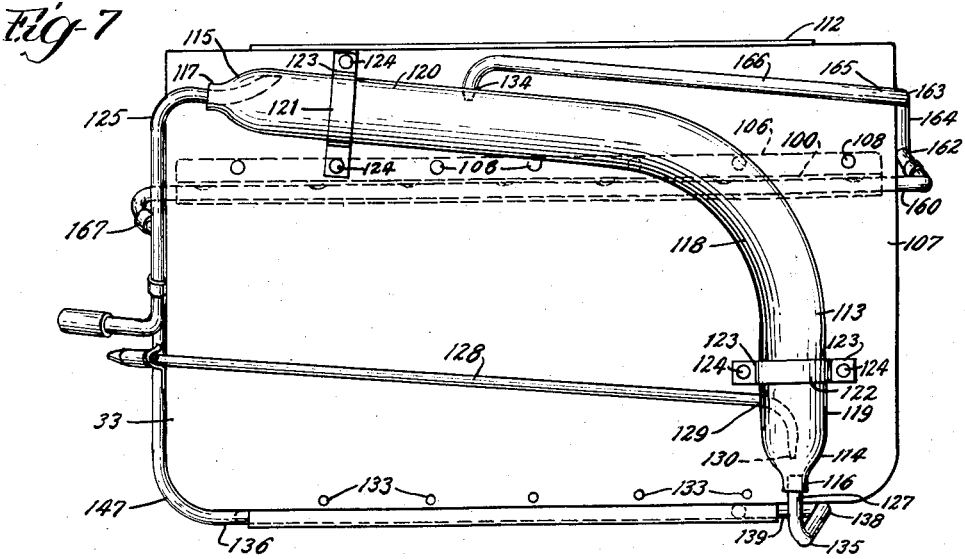
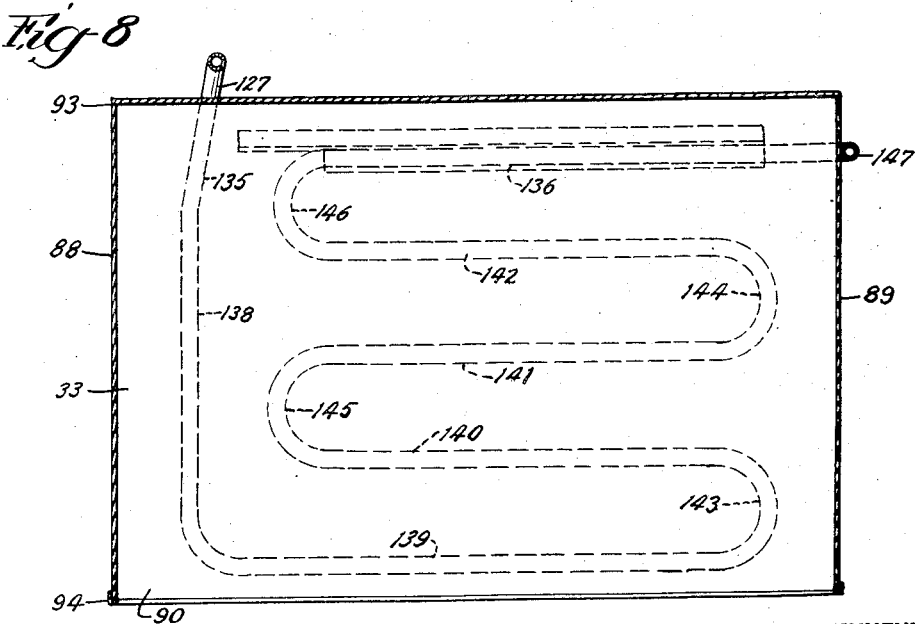
INVENTOR.
William B. Herndon Jr.
BY
Robert H. Jeudt
Atty.

March 5, 1957 W. B. HERNDON, JR 2,783,620
REFRIGERATION SYSTEM
Filed April 19, 1954 9 Sheets-Sheet 6
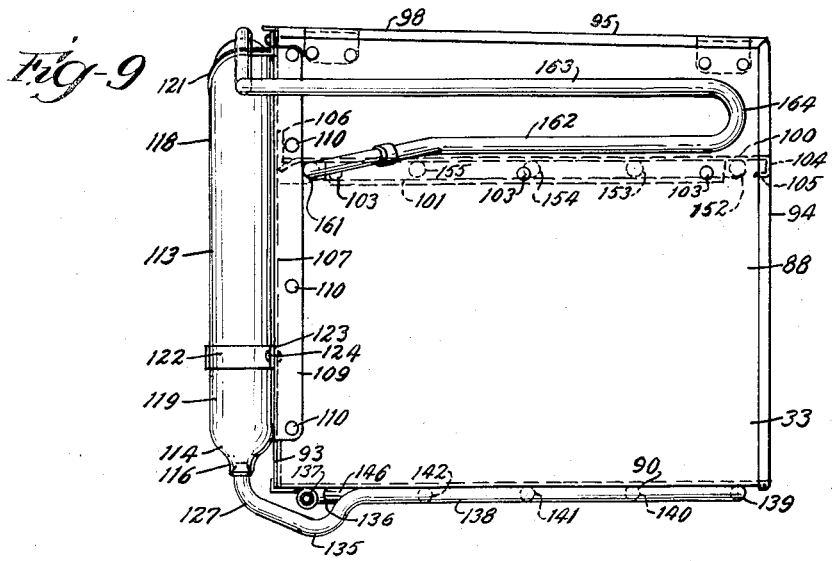
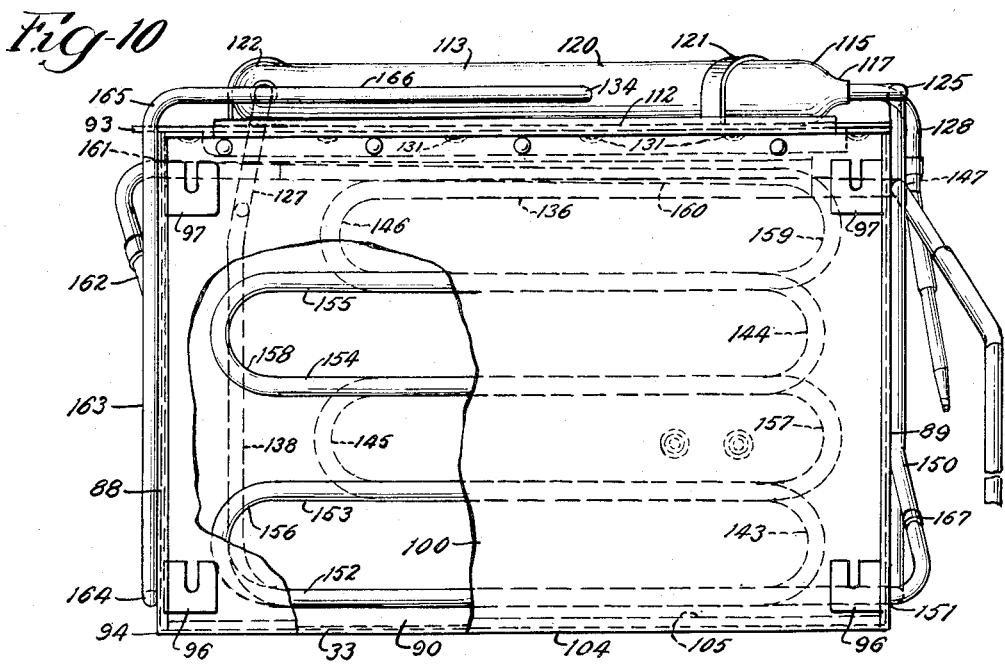
INVENTOR.
William B. Herndon Jr.
BY
Robert H. Tendt
ATTY.

March 5, 1957 — W. B. HERNDON, JR — 2,783,620
REFRIGERATION SYSTEM
Filed April 19, 1954 — 9 Sheets-Sheet 7
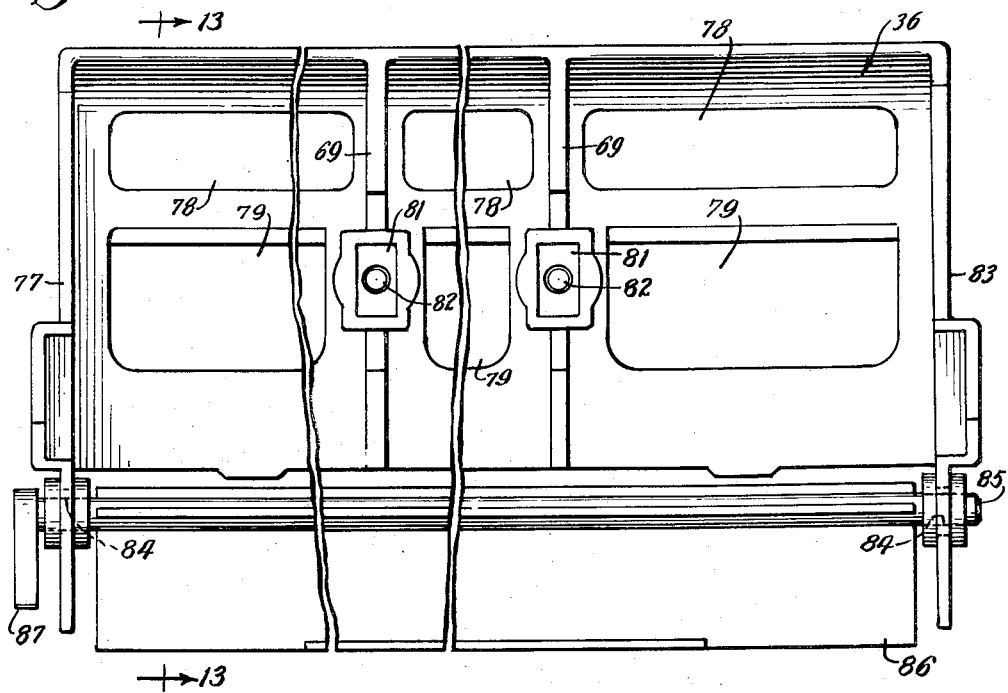
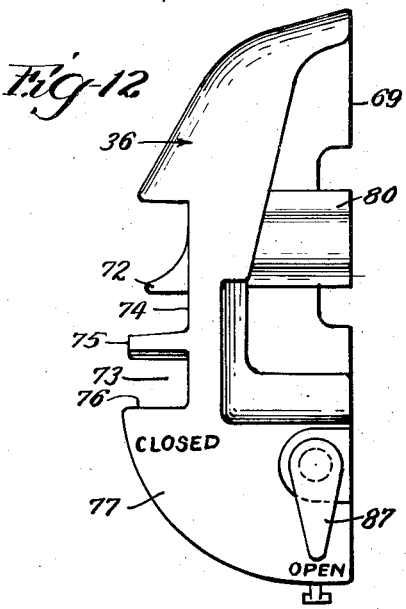
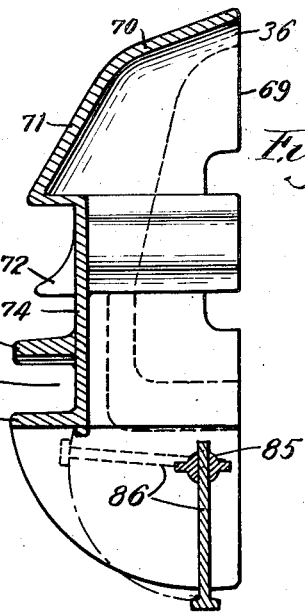
INVENTOR.
William B. Herndon Jr.
By: Robert H. Wendt
Atty.

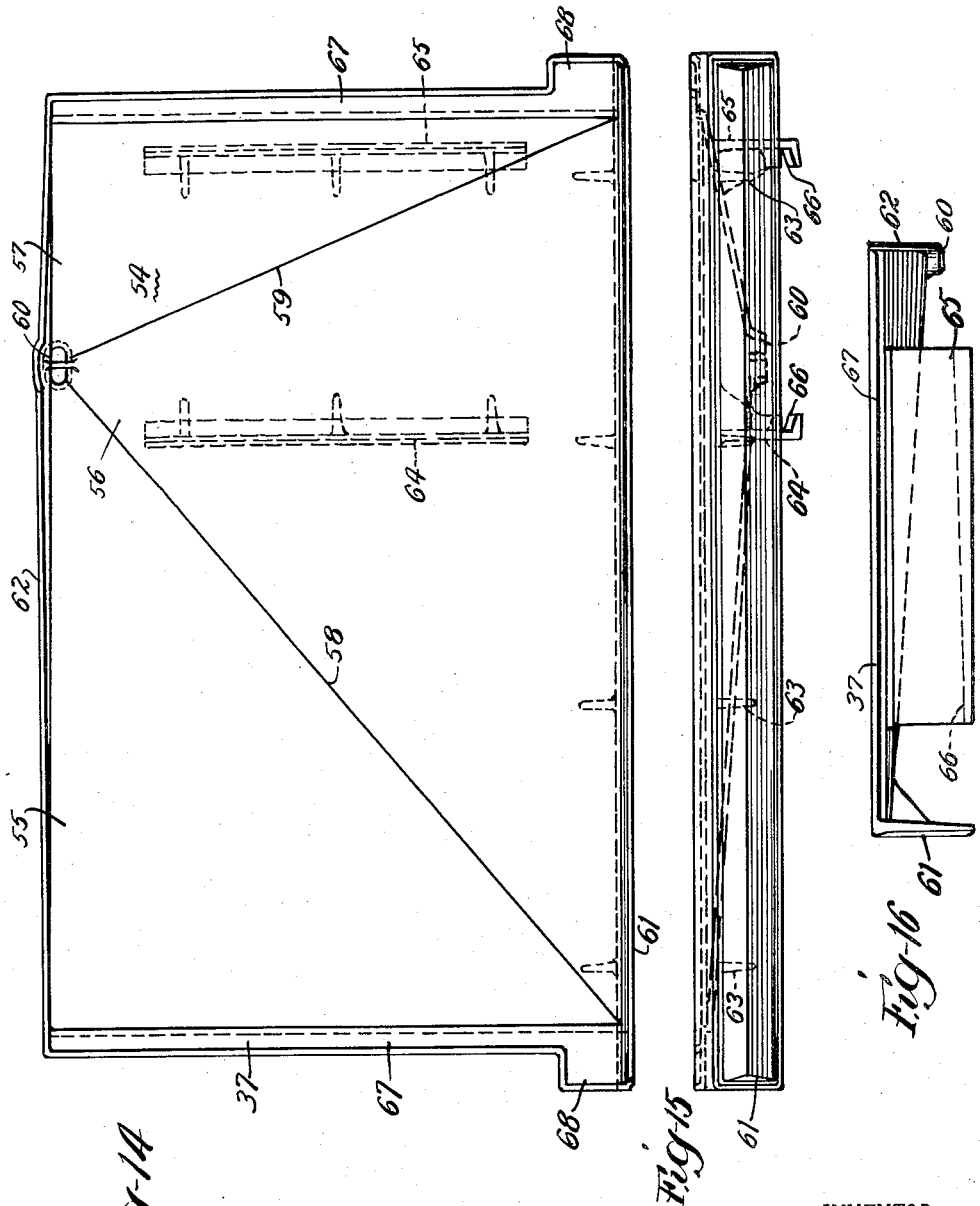

March 5, 1957  W. B. HERNDON, JR  2,783,620
REFRIGERATION SYSTEM
Filed April 19, 1954  9 Sheets-Sheet 9
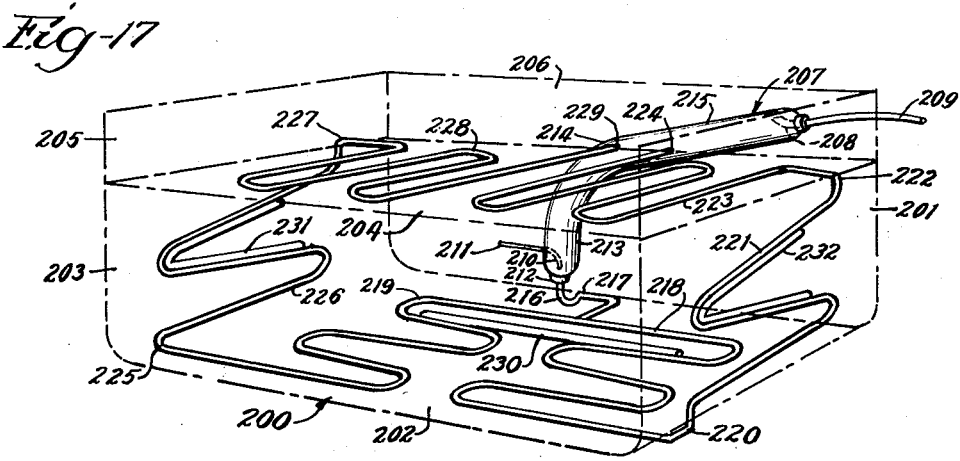
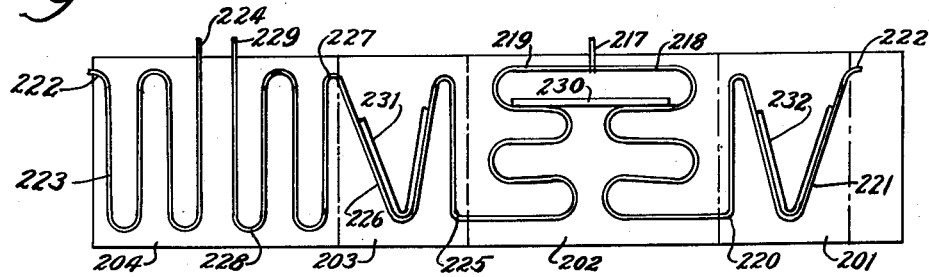
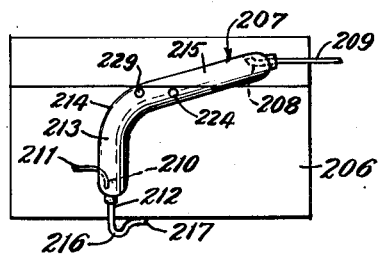
INVENTOR.
William B. Herndon, Jr.
BY
Robert H. Wendt
Atty.

2,783,620
REFRIGERATION SYSTEM

William B. Herndon, Jr., Evansville, Ind., assignor, by mesne assignments, to Whirlpool-Seeger Corporation, a corporation of Delaware Application April 19, 1954, Serial No. 423,920

22 Claims. (Cl. 62—116)

The present invention relates to a household refrigerator, refrigeration system and method of refrigeration, and is particularly concerned with refrigeration systems embodying the evaporator covered by my prior application, Serial No. 281,552, filed April 10, 1952, on evaporators for household refrigerators, issued August 24, 1954, Patent No. 2,687,023, and improved evaporators of a similar type.

One of the major difficulties involved with a refrigeration system having a high side unit, is that such a system is inefficient and susceptible to erratic cycling at low ambient temperatures and consequent low percent running time.

The reason for this is that the refrigerant used, commercially known as "Freon" or "F-12," and technically called "Dichlorodifluormethane," is completely miscible with oil; and the amount of refrigerant which is absorbed in the oil in the sump of the motor compressor is dependent on the temperature and pressure within the system.

At low ambient temperatures a very large amount of refrigerant is absorbed in the oil, greatly reducing the amount of refrigerant which is effective for cooling purposes. In some cases this deficiency of refrigerant in the evaporator is so severe that the evaporator is starved of refrigerant, and a long running cycle is necessary to heat the oil sufficiently to liberate the refrigerant which is absorbed in the oil and which is released by the oil as the temperature of the oil rises.

The lack of refrigerant in the evaporator during the major portion of the long running cycle and the low refrigerant level maintained in the evaporator when the refrigerator is operating in low ambient temperatures results in inefficiency during the refrigeration cycle.

In a high side unit, utilizing a series type evaporator, only a small portion of the evaporator is refrigerated by liquid refrigerant, at low percent running time, since a large portion of the refrigerant remains absorbed in the oil. Consequently it has been extremely difficult to maintain sufficiently low frozen food temperatures under these conditions.

It has been difficult also to defrost such a system by circulation of warm liquid and gas heated by electric heaters, because of the variation in the amount of refrigerant in the evaporator, which is due to refrigerant absorption in the oil located in the oil sump of the motor compressor because there may not be sufficient refrigerant available in the evaporator to circulate and distribute the heat from the hot refrigerant.

With such a system, according to the prior art, sometimes a defrost may be initiated when the refrigerant supply in the evaporator is low, and the result is that the heater becomes very hot, overheating the adjacent portion of the evaporator with a poor circulation of refrigerant and failure to defrost other parts of the evaporator.

One of the objects of the invention is the provision of a new and improved refrigeration system for a household refrigerator which overcomes the difficulties mentioned above, and which insures the presence of sufficient refrigerant in the evaporator at all times for efficient cooling, for maintaining sufficiently low temperatures for frozen food, and for defrosting of the evaporator by circulating hot refrigerant and gas through all parts of the evaporator.

Another object of the invention is the provision of an improved refrigeration system in which a substantially constant head of refrigerant may be maintained in the receiver of the evaporator although a large percentage of the refrigerant may still be absorbed in the oil, which is located in the oil sump of the motor compressor, so that refrigerant is always available in the evaporator for immediate cooling upon starting of the motor compressor; and for immediate and thorough heating of the evaporator by circulation of hot refrigerant and hot gas during the defrosting of the evaporator.

Another object of the invention is the provision of an improved refrigeration system in which the evaporator is provided with a receiver or header connected to a continuous run of tubing at both ends of the tubing, with the tubing arranged sinuously and in heat conducting contact with the bottom and sides of the evaporator, and bottom of a shelf, so that the head of refrigerant in the receiver or header may exert a pressure on the inlet tubing leading to the evaporator coils, facilitating circulation throughout the coils with the gas passing back to the top of the receiver or header.

Another object of the invention is the provision of an improved refrigeration system, including an evaporator having a header provided with a substantially constant head of refrigerant and sinuous coils including sections which cover the sides and bottom of the evaporator, and the bottom of a shelf, both ends of the tubing, which may consist of one continuous run, being connected to the receiver, one end being connected to the bottom and another to the top; and the tubing being provided with one or more electric heaters in heat conducting relation with the lowermost portion of the tubing and preferably toward the back side of the evaporator, so that the back may also be heated while the refrigerant is caused to boil up through the tubing to the top of the header, and the head of the refrigerant in the header constantly brings new liquid refrigerant down toward the heater to be heated.

Another object of the invention is the provision of an improved refrigeration system including an enlarged receiver or header having a vertical portion and provided with a supply of refrigerant in the header, and having an inlet from the capillary tube directed toward the lower outlet from the header, so that when pressure is equalized throughout the system between the running cycles of the motor compressor, the nozzle increases the velocity of the liquid and gas entering the evaporator from the high side which agitates the refrigerant in the header preventing it from becoming superheated and when the compressor motor is energized, ebullition immediately takes place in the evaporator. This agitation is even more violent during the running cycle; therefore, ebullition is continually promoted.

Another object of the invention is the provision of an improved refrigeration system in which the evaporator is adapted to maintain very low temperatures for frozen food and ice cream storage, and in which the evaporator may be defrosted quickly by means of electric heaters and circulation of refrigerant, so that the frozen food stored in the evaporator is subjected to a minimum amount of heat, and so that its temperature is hardly changed during the defrosting cycle.

Another object of the invention is the provision of an improved refrigeration system in which the defrost may be terminated by means of a thermostat, the power element of which may be gas filled, because the defrost may be terminated at a very low temperature which makes it unnecessary to use a cross-ambient charge in the thermostatic power element, as the danger of the capillary tubing of the power element touching anything colder than the evaporator has been minimized.

Another object of the invention is the provision of an improved evaporator and household refrigerator assembly, the parts of which are so arranged that all parts of the evaporator are efficiently cooled at all times to temperature inside the evaporator suitable for freezing ice and food, and for maintaining frozen food at a below-freezing temperature; and in which the rest of the cabinet can be maintained at a suitable above-freezing temperature for storage of foods which are not to be frozen, and in which the accumulated frost may be so quickly melted from the evaporator by the circulation of heated refrigerant, which is heated by means of one or more electrical heaters, so that the temperature inside the cabinet and that inside the evaporator are not substantially diminished.

Another object of the invention is the provision of an evaporator and cabinet arrangement of the class described, which is adapted to dispose of the condensate which is melted from the evaporator during the defrosting operation, and which collects said condensate in a suitable receptacle in a part of the cabinet which is maintained at an above-freezing temperature, so that the condensate may be poured out from time to time.

Other objects and advantages of the invention will be apparent from the following description and the accompanying drawings, in which similar characters of reference indicate similar parts throughout the several views.

Referring to the nine sheets of drawings accompanying the specification,

Fig. 3 is a diagrammatic illustration showing the component parts of the refrigeration system;

Fig. 4 is a view in perspective of the evaporator taken from the rear at one side and below the evaporator;

Fig. 5 is a front elevational view of the evaporator;

Fig. 6 is a side elevational view taken from the right side of Fig. 5;

Fig. 7 is a rear elevational view of the evaporator;

Fig. 8 is a sectional view taken on the line 8—8 of Fig. 5, showing the bottom of the evaporator;

Fig. 9 is a side elevational view taken from the left side of Fig. 5;

Fig. 10 is a top plan view of the evaporator;

Fig. 11 is a side elevational view of one of the guides for the combined air baffle and drip pan;

Fig. 12 is an end elevational view of the right guide;

Fig. 13 is a sectional view taken on the plane of the line 13—13 of Fig. 11;

Fig. 14 is a top plan view of the combined drip pan and air baffle;

Fig. 15 is a front elevational view of the combined drip pan and air baffle;

Fig. 16 is a side elevational view of the combined drip pan and air baffle taken on the plane of the line 16—16 of Fig. 1;

Fig. 17 is a view in perspective of another form of evaporator which may be used in the present refrigeration system;

Fig. 18 is a plan view of the bottom, sides, and shelf of the evaporator of Fig. 17, with the parts developed in one plane;

Fig. 19 is an elevational view of the rear wall showing the receiver of Fig. 17.

Figure 1:
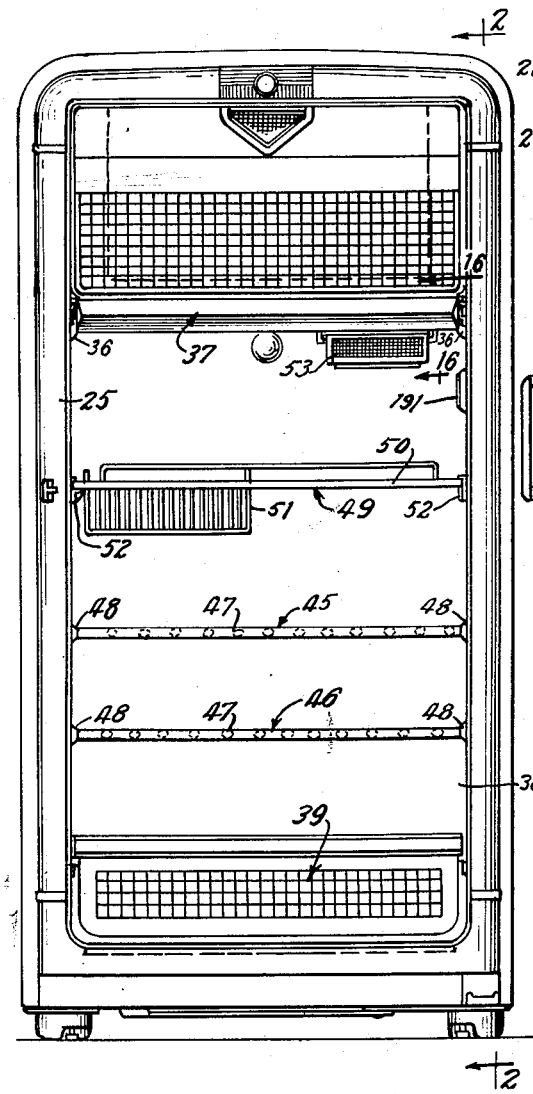
Fig. 1 is a front elevational view of a cabinet embodying the invention, shown without the door.
Figure 2:
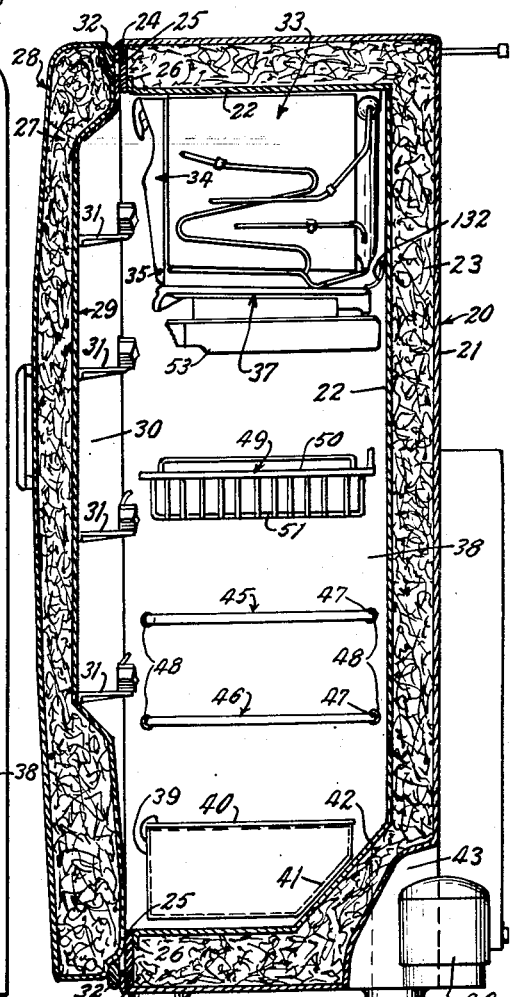
Fig. 2 is a vertical, sectional view taken on the plane of the line 2—2 of Fig. 1, with the door of the cabinet closed.

Referring to Figs. 1 and 2, the refrigeration system is preferably embodied in a household refrigerator comprising an insulated cabinet 20, having an outer shell 21, and an inner liner 22, both of which may be made of metal, and they are spaced from each other by a layer of suitable insulation 23.

The outer shell 21 is provided with an inwardly open groove 24, surrounding the door opening and receiving a breaker 25, which is also secured to an inwardly extending flange 26 on the liner 22.

The cabinet is closed by means of an insulated door 27, comprising an outer panel 28 and an inner panel 29, which may have a suitable recess 30 for housing a plurality of door shelves 31. The door is hinged on the cabinet and provided with the usual door seal 32.

The cabinet is provided with the evaporator 33, depending from the upper wall of the liner 22, and the open front of the evaporator 33 may be closed by an evaporator door 34, pivoted on trunnions 35, carried by bearings on the liner side walls.

Below the evaporator 33 the cabinet is provided with suitable guides 36, carried by the liner side walls, Fig. 12, for slidably supporting a combined air baffle and drip tray 37, further to be described.

The air baffle 37 divides the cabinet into the upper freezing zone inside and around the evaporator 33, and the lower food storage zone 38 below the air baffle 37.

In the food storage zone the cabinet may have a lower drawer 39 for preserving vegetables, slidably mounted on suitable guides and provided with a glass cover 40.

The drawer is beveled at 41 at its bottom on the rear end to make it complementary to the diagonal portion 42 of the liner, which is suitably spaced from the metal cavity 43 in the shell 21, at the bottom rear corner for housing substantially half of the motor compressor 44.

Various types of shelves may be provided in the liner 22, such as the wire shelves 45 and 46, each of which has the front and rear wire frame members 47, which project laterally into plastic or rubber grommets 48, secured in apertures in the liner side wall.

Above the wire shelves 45 and 46, another removable shelf 49 may be provided, having a rectangular frame 50 and a depending bottle basket 51, slidably mounted upon guides 52.

The combined baffle and drip tray 37 carries a depending container, such as a drawer 53, for receiving condensate from the drip tray. These members are shown in greater detail in Figs. 14 to 16, where Fig. 14 shows the drip tray having a substantially rectangular shape which includes a central body 54, comprising three portions 55, 56, and 57, of triangular shape, integrally joined together along the lines 58 and 59, and all draining backward and downward to a rear drain opening 60 above the condensate container 53.

The drip tray has a forward facing flange 61, which also serves as a handle, and a rear border flange 62, and the body portions are reinforced by depending ribs 63. The body also has a pair of depending guide flanges 64 and 65, provided with parallel slots 66 for receiving the laterally projecting edges of the condensate container 53; and the guide flanges depend below the drip tray so that the condensate container may be located below the container.

The drip tray has laterally projecting flanges 67, extending forward to a wider stop flange 68, on each side, and the flanges 67 are slidably mounted in guides carried by the liner walls and indicated at 36.

These guides are shown in greater detail in Figs. 11 to 13, and also comprise a pivoted louver in each case for controlling the air flow. Guide 36 comprises a molded elongated plastic member which has its flat side 69 engaging the liner wall.

The guide comprises a shell, the body of which projects laterally at 70, into the storage space and downwardly at 71, and is provided with a drip deflector 72 above the groove 73 for the drip pan.

The groove 73 is defined by a wall 74 and a pair of forwardly extending flanges 75 and 76. The front end of each guide is provided with an end wall 77, as shown in Fig. 12, concealing the interior of the guide which has a plurality of rectangular openings 78 and 79 for passing air which circulates past the drip pan and baffle 37, going upward on both sides and downward behind and in front of the drip tray.

The guide which is shown is for the right side of the cabinet, and Fig. 11 shows the side which is disposed toward the liner and which is mounted on the liner by means of integral studs 80 and clips 81, mounted on screw bolts 82.

The front and rear end walls 77 and 83 are provided with apertures 84 for rotatably supporting a shaft 85, carrying a depending louver 86.

The front wall 77 has indicia "closed" and "open," and the shaft 85 carries an actuating pointer 87 by means of which the louver may be turned to the downward or open position, or upward to the dotted line position shown in Fig. 13.

Thus the air is adapted to circulate about the evaporator from the lower compartment upward and down from the evaporator to cool the lower compartment, and the louver may be regulated to prevent overcooling of the lower food storage compartment.

The evaporator 33 is shown in detail in Figs. 6 to 10, and it comprises a sheet metal member of substantially inverted U-shape, which may be made out of sheet aluminum.

Fig. 5 shows a front view in which the side walls are indicated at 88 and 89, joined to the bottom wall 90 by the easy bends 91 and 92.

The side walls 88 and 89 are trapezoidal in shape, being longer at the rear edge 93 than the front edge 94, so that the top edge 95 appears to slope upward toward the back in Fig. 6, where the bottom wall 90 is disposed horizontally.

When the evaporator is installed in the liner it is carried by front and rear angle brackets 96, 97, on each side wall; and the top of the liner being horizontal and level, this causes the bottom 90 to slope downward toward the rear for drainage of the interior of the evaporator toward the back.

The evaporator side walls and bottom are preferably made of a single sheet which may be provided with a U-bend 98, the edge being bent back upon itself at the top on each side wall to provide a finished edge, and the same is true at the front U-bend 99, which finishes the front edge of the sheet.

The side walls carry a shelf 100, comprising a rectangular sheet of aluminum which is turned downwardly at each lateral edge to provide attaching flanges 101, 102, which are riveted to the side walls 88 and 89, by a plurality of rivets 103.

The forward edge of the shelf has a depending facing flange 104, which is turned backwardly at 105, substantially concealing the tubing that is carried by the lower side of the shelf. At its rear edge the shelf is provided with an upwardly turned attaching flange 106 for the purpose of providing additional support for the rear wall 107, which is secured to the shelf by a plurality of rivets 108.

The rear wall 107 has attaching flanges 109 at each lateral edge which extend over the side walls and are secured to the side walls by a plurality of rivets 110.

At its bottom the rear wall has an inwardly turned flange 111, overlapping the bottom wall, and at its top it has a backwardly turned flange 112 engaging the top of the liner.

The rear wall 107 of the evaporator 33 supports a receiver or header 113, comprising an enlarged tubular member, both ends of which are spun inward at 114 and 115 to provide tubular end portions 116 and 117, having bores of sufficient size to fit the tubing which is joined to the receiver at these points.

The receiver 113 has an easy angular bend at 118 at the shelf level integrally joining the vertical portion 119, and the substantially horizontal portion 120 which extends across the rear of the evaporator toward the side 89.

Receiver 113 is secured to the rear wall by the partially cylindrical clamping bends 121 and 122, each of which has attaching flanges 123 secured to the rear wall by rivets 124.

The receiver thus has the vertical portion 119 which may be filled with a head of liquid refrigerant at all times for stimulating circulation and for providing refrigerant which is immediately ready to circulate through the evaporator when the compressor starts. It also has the horizontal portion 120 above the shell level which is adapted to receive surplus or excess refrigerant while still maintaining a substantially constant liquid head because free level of liquid does not rise much in the horizontal portion 120 because of its large horizontal projected area.

The suction outlet of the receiver is at the tubular portion 117, where the suction tube 125 is sealed in the tubular portion 117, and has an upwardly turned open end 126 disposed at the highest point in the receiver for pumping only vapor or gas out of the receiver to the compressor.

The receiver outlet is at 116 at the bottom of its vertical portion 119, where the outlet tube 127 from the receiver is sealed in the tubular portion 117.

The inlet to the receiver is from the inlet tube 128, which is sealed in the side wall of the receiver at 129, and has a downwardly pointing nozzle 130 directed toward the outlet 127 for stimulating circulation downward out of the outlet 127.

The rear wall 107 is provided with a multiplicity of half circular drain apertures 131, Fig. 5, at the shelf level, and as the shelf is equally spaced from the bottom wall the shelf drains toward the back so that any condensate may run out of the drain aperture 131 into the drip pan 37.

A curved baffle 132, Fig. 2, is carried by the rear wall of the liner and projects over the drip pan 37 to direct condensate toward the drip pan which may come from the upper liner or from the receiver.

The rear wall 107 is also provided with drain apertures 133, Fig. 7, at the bottom wall level so that the bottom wall may drain rearwardly through the rear wall.

The evaporator walls are preferably cooled by one continuous length or run of metal tubing which has both of its ends connected to the receiver 113. One end of this continuous run of tubing is connected to the receiver outlet at 127; the other end of the tubing is connected to the receiver 113 at the upper part of its horizontal portion 120 at the point 134, where the tubing is sealed in the top wall of the receiver 113.

The circulation of refrigerant is downward from the outlet 127 of the receiver as follows:

The tubing 127, Fig. 6, dips downward at 135, below the defrost heater 137, forming a liquid trap which, however, is not necessary in every embodiment of the invention. The liquid trap 135 may serve to prevent backward circulation.

The tubing is then arranged sinuously on the bottom 90 of the evaporator, to which it is brazed so that the metal coils are in close heat conductive relation to the bottom 90.

The tubing may proceed sinuously in either direction, but in the present assembly there is a forwardly extending tube 138 from the trap 135, and this terminates at a front lateral pass 139 which extends to a plurality of other lateral passes 140, 141, 142, joined to each other by the U-shaped bends 143, 144 and 145, Fig. 3, Fig. 4.

The U-shaped bend 146 joins this tubing to the rear pass 136, which is located adjacent the rear wall 107, where the electric heater 137 is located for defrosting purposes, further to be described.

From the rear pass 136 the tubing turns upwardly at 147 on the right side of the evaporator, Fig. 6, and is sinuously arranged on the side wall 89 by passes 148, 149 and 150, all located below the shelf 100, and generally sloping downward toward the vertical tubing 147.

The continuous length of tubing then passes through the side wall 89 at 151, below the shelf, and is sinuously arranged and secured in heat conducting relation to the bottom of the shelf 100.

The shelf section of the evaporator coils may comprise a plurality of lateral passes 152, 153, 154 and 155, joined by U-bends 156, 157, 158, 159, terminating in a rear lateral pass 160 close to the rear wall 107.

The evaporator coils on the bottom of the shelf pass through the side wall 88 at 161, and are sinuously arranged on the side wall 88 by means of a plurality of forward and backward passes 162, 163, joined by a U-bend 164 on the upper portion of the side wall 88.

At 165 the tubing extends around the corner and laterally on the back wall at 166, connecting with the upper part of the receiver at 134. This connection is preferably spaced from the suction outlet 126, so that there may be a minimum amount of turbulence at the suction outlet to avoid slugs of liquid boiling up at that point.

It will be noted that the upper part of the side wall 89 is without tubing and the lower part of the side wall 88 is without tubing, but that the continuous run of tubing is thus arranged in horizontal planes or extending upwardly from the bottom of the receiver to the top of the receiver.

For convenience in manufacture there may be a joint in the tubing at 167, and a joint on the opposite side of the ice freezing shelf which joins pass 162 to the tube extending from the shelf. It is not necessary that the tubing be all in one integral piece but it is arranged with all of its parts in series from inlet to outlet of the evaporator coils.

The electric heater 137 is preferably of the type having a resistance wire eubedded in refractory powder and housed in a metal tubular sheath which is hermetically sealed at 168 and 169, where the electric conductors 170 and 171 emerge from the sheath. The sheath is preferably aluminum to avoid electrolytic action by the dissimilar metals of the sheath and tubing.

The heater 137 is clamped in heat engaging contact with the tubing at the rear pass 136 on the bottom by means of elongated clamping flanges 172, 173 which clamp these parts together.

The conductor 170 leads to a metal sheathed electric fuse 174, which is also clamped to the heater assembly by means of a clamping member 175, so that the fuse 174 may be melted not by an overload of current but by overheating, which is due to the heater 137 in the event its heat is localized by absence of sufficient refrigerant to carry the heat to all parts of the evaporator.

The refrigeration system is shown in Fig. 3, including the evaporator just described. The system includes a motor compressor 176 enclosed in a single housing having the motor 177 in its upper portion directly connected to a compressor 178 in a lower portion 179, which is also an oil sump.

The outlet from the motor compressor 178 is at 180 into a tube 181 which passes through the oil sump and through the oil sump wall to a precooler condenser 182.

The precooler condenser 182 may consist of a plurality of horizontal or vertical passes of tubing arranged in sinuous fashion and joined by U-bends located above the motor compressor 176 and supported thereby.

The coils of the precooler condenser 182 may be joined by fins or wires for increasing the heat radiating area. From the precooler condenser 182 the tubing 183 extends into the top of the motor housing 177, discharging refrigerant and oil into the top of the motor housing, the refrigerant being partially condensed so that it may be revaporized by the motor heat, cooling the motor as the refrigerant engages the motor parts and the oil trickles down into the sump 179.

The refrigerant passes out of the top of the motor housing in the form of vapor under high compression at 184 and is carried to the sinuous coils 185 of a main condenser 186, having fins or wires 187 for increasing the radiating area of the main condenser.

In the main condenser the compressed gas is liquefied and is held under compression during the refrigerating cycle by the capillary tube 128, which extends to the receiver inlet 130. The motor compressor has an oil inlet 188 in its bottom plate and being immersed in oil in the sump 179, oil is forced into the motor compressor to lubricate it and carry it up the shaft to lubricate the motor.

A refrigerant drier capsule 189 is preferably interposed between the capillary tube 128 and the main condenser and contains a pair of screens 190, with a supply of silica gel powder between them for absorbing any water which may be found in the refrigerant.

The operation of the system is as follows:

The motor compressor is controlled by the usual thermostatic switch, called a cold control, the adjustable knob of which is shown at 191 on the right wall of the liner in Fig. 1.

The cold control bulb 192 is carried by an angular metallic bracket 193 in spaced relation to the evaporator wall 89, to which it is riveted, so that the cold control is responsive to the temperature of the adjacent air as well as the evaporator.

The capillary tube 194 connects to the usual bellows which controls the electric switch of the cold control, not shown.

The refrigeration system is provided with a suitable supply of mineral lubricating oil, filling the oil sump 179, and with a suitable charge of refrigerant which is adapted to flood the evaporator, filling the evaporator with liquid in the vertical portion 119 of the receiver, even when a large proportion of the refrigerant is absorbed in the oil sump 179, at low ambient temperatures.

At higher ambient temperatures the refrigerant absorbed in the lubricant is driven out of the oil and the refrigerant in the receiver 113 reaches a higher level, occupying a large portion of the volume in the horizontal part 120 of the receiver 113.

This increased liquid refrigerant in the receiver does not greatly vary the height of the free surface because the horizontal portion 120 of the receiver 113 has a large horizontal space for refrigerant.

The cold control turns on the motor compressor whenever the temperature of the evaporator and the adjacent air reaches a point which is determined by the adjustment of the cold control; and the motor compressor places a suction on the suction outlet 126 of the receiver and new refrigerant is discharged into the receiver at the nozzle 130, which is directed downwardly toward the outlet 127 of the receiver.

The supply of refrigerant on hand in the receiver begins to cause circulation downward in the vertical leg 119 of the receiver, into the lower sinuous coils 136—142 of the evaporator; and the suction pressure in the top of the receiver reduces the pressure in the upper coils of the evaporator, causing the refrigerant to circulate upward on both sides of the evaporator and through the shelf coils back to the receiver at 134.

The refrigerant which is compressed in the compressor is taken away from the compressor at once through the tubing 181 and carried to the preliminary cooling coils 182, with entrained oil that is drawn into the compressor from the sump at the oil inlet 188.

The oil and refrigerant are cooled in the preliminary cooling coils 182, and the hot refrigerant vapor is partially condensed and cooled below the temperature of the motor.

The oil which is in the form of a mist, entrained by the refrigerant, is consolidated into droplets, and the oil and refrigerant which have received their preliminary cooling are delivered by conduit 183 into the top of motor housing 177.

The oil and condensed refrigerant run down over the motor parts, the oil finding its way into the sump 179, and the refrigerant being revaporized and utilizing the heat of vaporization for cooling the motor parts.

The refrigerant vapor still under high pressure passes out of the top of the motor housing 177 at conduit 184 and is carried to the coils 186 of the main condenser, where it is cooled by the ambient air acting on the cooling fins 187, and the refrigerant is reduced to a liquid.

The refrigerant passes through the drier capsule 189, where any water or water vapor is absorbed, and is carried by capillary 128 to the evaporator.

The two condensers comprising preliminary cooler 182 and main condenser 186 are cooled by the convection currents of air which are heated by these condensers and by the motor compressor, and which pass upwardly about the condensers.

The capillary tube 128 is in heat conducting relation with the suction tube 125 which abstracts some heat from the capillary tube and liquid refrigerant contained therein and increases the efficiency of the system.

The inlet tube 128 enters the receiver 113 at 129, and has a downwardly turned nozzle 130 which tends to promote circulation out of the receiver outlet 127.

The compressor is provided with a check valve, preventing the return of refrigerant to the compressor at the high pressure outlet 180, and even between cycles the pressure of refrigerant in the capillary tube tends to promote circulation of refrigerant throughout this evaporator, the circulation being aided by the head of liquid refrigerant in the receiver 113.

Since there is always a sufficient liquid head in the evaporator to insure that the refrigerant tubes on the evaporator are at all times generously supplied with liquid refrigerant, the evaporator is uniformly cooled and is ready to handle efficiently any loads placed upon it.

When the evaporator is loaded the evaporator goes to work immediately, operating at a high suction pressure, which, in turn, gives a very effective load recovery under all conditions.

The interior of the evaporator is maintained at below-freezing temperatures at all times so that frozen food may be maintained at freezing temperatures while the space in the box outside the evaporator is maintained at above-freezing temperatures.

When a suitable amount of frost has been deposited on the evaporator which requires defrosting, the defrosting cycle may be initiated by a manual control or a time control, as described in the prior applications of Thomas W. Duncan, Serial Nos. 144,641, now Patent No. 2,701,450, and 272,812, now Patent No. 2,736,173, which applications are hereby incorporated by reference thereto.

The electric heater 137 is then energized, heating the refrigerant coils on the bottom of the evaporator and causing the refrigerant to circulate upward through the coils on the side of the evaporator and on the shelf.

There is always sufficient liquid refrigerant in the receiver to supply the coils that are being heated with additional liquid refrigerant, which circulates throughout the evaporator coils and is returned to the receiver so that all parts of the evaporator are defrosted.

Having the heater near the rear of the evaporator aids in defrosting the rear wall and the defrosting continues until the defrost termination bulb 195 reaches a predetermined temperature, at which its bellows operates the defrost control shown in the said Duncan applications to terminate the defrost by cutting out the electric heater and cutting in the motor compressor circuit.

There is no possibility of the evaporator becoming too hot locally because there is always sufficient refrigerant to circulate throughout the evaporator and distribute the heat of the electric heater 137.

The electric heater circuit includes an electric fuse 174 disposed in heat-engaging contact with the heater bracket 172, 173, by means of a clamp 175, and this is additional assurance that the evaporator will not become too hot locally at the electric fuse 174, which will be melted to break the circuit when the temperature of the fuse reaches a predetermined value.

The fuse 174 operates by overheating and not by passage of too much current. By heating the coils on the bottom of the evaporator, which are filled with refrigerant and supplied with more refrigerant from the head of refrigerant in the receiver; and by circulating refrigerant throughout the evaporator, the defrost is accomplished so quickly that frozen food in the evaporator is not warmed to any substantial amount, and the defrost is terminated and cooling resumed within a very short time.

The evaporator cools the air outside the evaporator in the cabinet to a temperature above freezing, and the air circulates up both sides of the cabinet where the warm air passes through the apertures in the guides 36, and reaches the outside of the evaporator.

This air is cooled and passes down the front of the cabinet, cooling the shelves and passing to the bottom of the food storage space, where it passes about the crisper drawer 39.

When the refrigerator is used at higher ambient temperatures and the motor compressor runs more frequently to maintain below-freezing temperature inside the evaporator, overcooling of the food storage space outside the evaporator may be prevented by reducing the air circulation by closing wholly or partially the openings through the guides 36 by means of the pivoted louvers 86.

Reduction of air circulation from the food storage compartment to the outside of the evaporator effectively reduces the cooling of the food storage compartment.

Referring to Fig. 17, this is a phantom view in perspective of another form of evaporator shown in my prior application, having a slightly different arrangement of the evaporator coils.

This evaporator, indicated by the number 200, may be substantially U-shape, having its right side 201, bottom 202, and left side 203, all made of one piece of metal, such as aluminum.

The shelf 204 of the left side may be a separate piece, and the rear may be closed by a rear wall 206, supporting an angular receiver 207.

The receiver has its suction outlet at the upturned end 208 of the suction tube 209, and has its inlet at the downwardly turned nozzle 210 of the capillary tube 211.

The receiver has its liquid outlet at 212, at the lower end of the vertical portion 213 of the receiver, which has an easy bend at 214, and has a horizontal portion 215.

The outlet 212, from the receiver, may have a trap at 216, and is connected by tube 217 to the sinuous coils 218 and 219 on the bottom 202 of the evaporator.

The sinuous coils 218 and 219 are arranged to provide two parallel circuits from the inlet tube 217, and after traversing the bottom sinuously the coils 218 are connected at 220 to the V-shaped coils 221 on the side 201 of the evaporator.

V-shaped coil 221 is connected at 222 to the sinuous coils 223 on the right half of the shelf 204. These coils 223 extend sinuously across the right half of the shelf, which is at the left end of Fig. 18, and are connected at 224 to the upper part of the receiver 207, substantially at shelf level.

The sinuous coils 219 extend sinuously forward on the bottom 202 and are connected at 225 to the V-shaped coils 226 on the left side 203 of the evaporator.

The coils 226 are connected at 227 to the sinuous coils 228, secured to the under side of the left half of the shelf 204; and these are connected at 229 to the upper part of the receiver 207.

The receiver is filled with a charge of refrigerant which at all times extends above the shelf so that the coils tend to be filled with refrigerant at all times.

In this embodiment of the invention the defrosting heaters which may be clamped to the evaporator in the same way are the heater 230, applied to both sinuous coils 218, 219, on the bottom 202, or the V-shaped heaters 231 and 232, applied to the V-shaped coils 226 and 221 on the sides of the evaporator.

The operation of this evaporator during freezing and during defrosting is substantially the same as those already described.

It will thus be observed that I have invented an improved refrigeration system and improved defrosting system, in which the evaporator is provided with a liquid head of refrigerant at substantially constant level at all times, so that refrigerant is immediately available for cooling and for defrosting by hot refrigerant, which is heated by electric heaters arranged on the bottom or lower portions of the evaporator.

The charge of refrigerant is sufficient to maintain a head of refrigerant in the receiver even under low ambients, when a large proportion of the refrigerant is absorbed in the oil in the oil sump.

The supply of new liquid refrigerant to the receiver is arranged with a nozzle pointing toward the liquid refrigerant outlet, initiating circulation of the refrigerant through the lower coils of the evaporator upward through the side coils and shelf coils to the receiver.

This circulation goes on even between compressor cycles when pressures are being equalized throughout the system by discharge of new refrigerant into the receiver. There is no possibility of overheating of the evaporator locally by the electric heater because the heat is immediately carried away to all parts of the evaporator through its coils by the circulating refrigerant, which effects a quick defrosting action of all parts of the evaporator.

While I have illustrated a preferred embodiment of my invention, many modifications may be made without departing from the spirit of the invention, and I do not wish to be limited to the precise details of construction set forth, but desire to avail myself of all changes within the scope of the appended claims.

I claim:

1. A refrigeration system comprising an insulated cabinet having an outer shell, an inner liner, and a door opening closed by an insulated door, a substantially U-shaped evaporator carried by the top wall of said liner, said evaporator comprising an integral pair of side walls joined by a bottom wall, said side walls being trapezoidal in shape and longer at their rear edges, thereby causing the bottom wall to slope rearwardly, said evaporator having a rear wall provided with drain apertures above the bottom level, a motor compressor, condenser, and capillary restrictor, a receiver comprising an enlarged tubular member having an angular bend, forming an upper substantially horizontal portion and a lower substantially vertical portion, said upper portion having a suction tube connected to said compressor, a continuous length of evaporator tubing connected to the lower outlet of said vertical portion and extending sinuously underneath the bottom of said evaporator, upward on one side wall and upward on the other side wall, and discharging into the top of said receiver, said receiver having an inlet communicating with the capillary tube at the lower portion of said receiver, the refrigerant level extending at all times to the top of said vertical portion of said receiver, the said evaporator tubing below the level of said liquid refrigerant in said receiver being flooded at all times and ready to cause immediate circulation and refrigeration upon starting of the motor compressor, the refrigerant boiling upward in said continuous tubing, and the head of refrigerant in said receiver promoting circulation.

2. A refrigeration system comprising an insulated cabinet having an outer shell, an inner liner, and a door opening closed by an insulated door, a substantially U-shaped evaporator carried by the top wall of said liner, said evaporator comprising an integral pair of side walls joined by a bottom wall, said side walls being trapezoidal in shape and longer at their rear edges, thereby causing the bottom wall to slope rearwardly, said evaporator having a rear wall provided with drain apertures above the bottom level, a motor compressor, condenser, and capillary restrictor, a receiver comprising an enlarged tubular member having an angular bend, forming an upper substantially horizontal portion and a lower substantially vertical portion, said upper portion having a suction tube connected to said compressor, a continuous length of evaporator tubing connected to the lower outlet of said vertical portion and extending sinuously underneath the bottom of said evaporator, upward on one side wall and upward on the other side wall, and discharging into the top of said receiver, said receiver having an inlet communicating with the capillary tube at the lower portion of said receiver, the refrigerant level extending at all times to the top of said vertical portion of said receiver, the said evaporator tubing below the level of said liquid refrigerant in said receiver being flooded at all times and ready to cause immediate circulation and refrigeration upon starting of the motor compressor, the refrigerant boiling upward in said continuous tubing, and the head of refrigerant in said receiver promoting circulation, the said capillary inlet having a downwardly turned end provided with a nozzle directed toward the liquid outlet at the bottom of said receiver, and further promoting circulation of liquid refrigerant out of said outlet.

3. A refrigeration system comprising an insulated cabinet having an outer shell, an inner liner, and a door opening closed by an insulated door, a substantially U-shaped evaporator carried by the top wall of said liner, said evaporator comprising an integral pair of side walls joined by a bottom wall, said side walls being trapezoidal in shape and longer at their rear edges, thereby causing the bottom wall to slope rearwardly, said evaporator having a rear wall provided with drain apertures above the bottom level, a motor compressor, condenser, and capillary restrictor, a receiver comprising an enlarged tubular member having an angular bend, forming an upper substantially horizontal portion and a lower substantially vertical portion, said upper portion having a suction tube connected to said compressor, a continuous length of evaporator tubing connected to the lower outlet of said vertical portion and extending sinuously underneath the bottom of said evaporator, upward on one side wall and upward on the other side wall, and discharging into the top of said receiver, said receiver having an inlet communicating with the capillary tube at the lower portion of said receiver, the refrigerant level extending at all times to the top of said vertical portion of said receiver, the said evaporator tubing below the level of said liquid refrigerant in said receiver being flooded at all times and ready to cause immediate circulation and refrigeration upon starting of the motor compressor, the refrigerant boiling upward in said continuous tubing, and the head of refrigerant in said receiver promoting circulation, the said cabinet being provided with lateral guides carried by the liner below said evaporator, and a combined drip pan and air baffle carried by said guides and extending to the front edge of said evaporator.

4. A refrigeration system comprising an insulated cabinet having an outer shell, an inner liner, and a door opening closed by an insulated door, a substantially U-shaped evaporator carried by the top wall of said liner, said evaporator comprising an integral pair of side walls joined by a bottom wall, said side walls being trapezoidal in shape and longer at their rear edges, thereby causing the bottom wall to slope rearwardly, said evaporator having a rear wall provided with drain apertures above the bottom level, a motor compressor, condenser, and capillary restrictor, a receiver comprising an enlarged tubular member having an angular bend, forming an upper substantially horizontal portion and a lower substantially vertical portion, said upper portion having a suction tube connected to said compressor, a continuous length of evaporator tubing connected to the lower outlet of said vertical portion and extending sinuously underneath the bottom of said evaporator, upward on one side wall and upward on the other side wall, and discharging into the top of said receiver, said receiver having an inlet communicating with the capillary tube at the lower portion of said receiver, the refrigerant level extending at all times to the top of said vertical portion of said receiver, the said evaporator tubing below the level of said liquid refrigerant in said receiver being flooded at all times and ready to cause immediate circulation and refrigeration upon starting of the motor compressor, the refrigerant boiling upward in said continuous tubing, and the head of refrigerant in said receiver promoting circulation, the said cabinet being provided with lateral guides carried by the liner below said evaporator, and a combined drip pan and air baffle carried by said guides and extending to the front edge of said evaporator, and a door for closing the front end of said evaporator pivotally mounted at its lower edge on said liner, said door engaging the front edges of the evaporator and extending to the forward edge of said air baffle.

5. A refrigeration system comprising an insulated cabinet having an outer shell, an inner liner, and a door opening closed by an insulated door, a substantially U-shaped evaporator carried by the top wall of said liner, said evaporator comprising an integral pair of side walls joined by a bottom wall, said side walls being trapezoidal in shape and longer at their rear edges, thereby causing the bottom wall to slope rearwardly, said evaporator having a rear wall provided with drain apertures above the bottom level, a motor compressor, condenser, and capillary restrictor, a receiver comprising an enlarged tubular member having an angular bend, forming an upper substantially horizontal portion and a lower substantially vertical portion, said upper portion having a suction tube connected to said compressor, a continuous length of evaporator tubing connected to the lower outlet of said vertical portion and extending sinuously underneath the bottom of said evaporator, upward on one side wall and upward on the other side wall, and discharging into the top of said receiver, said receiver having an inlet communicating with the capillary tube at the lower portion of said receiver, the refrigerant level extending at all times to the top of said vertical portion of said receiver, the said evaporator tubing below the level of said liquid refrigerant in said receiver being flooded at all times and ready to cause immediate circulation and refrigeration upon starting of the motor compressor, the refrigerant boiling upward in said continuous tubing, and the head of refrigerant in said receiver promoting circulation, the said cabinet being provided with lateral guides carried by the liner below said evaporator, and a combined drip pan and air baffle carried by said guides and extending to the front edge of said evaporator, and a door for closing the front end of said evaporator pivotally mounted at its lower edge on said liner, said door engaging the front edges of the evaporator and extending to the forward edge of said air baffle, the said guides being provided with through air passages for permitting the upward circulation of air to said evaporator, and each guide being provided with a pivoted louver having a forward control member for manual adjustment of the louver to regulate the amount of air circulation to determine the amount of cooling in the cabinet below said air baffle.

6. A refrigeration system comprising an insulated cabinet having an outer shell, an inner liner, and a door opening closed by an insulated door, a substantially U-shaped evaporator carried by the top wall of said liner, said evaporator comprising an integral pair of side walls joined by a bottom wall, said side walls being trapezoidal in shape and longer at their rear edges, thereby causing the bottom wall to slope rearwardly, said evaporator having a rear wall provided with drain apertures above the bottom level, a motor compressor, condenser, and capillary restrictor, a receiver comprising an enlarged tubular member having an angular bend, forming an upper substantially horizontal portion and a lower substantially vertical portion, said upper portion having a suction tube connected to said compressor, a continuous length of evaporator tubing connected to the lower outlet of said vertical portion and extending sinuously underneath the bottom of said evaporator, upward on one side wall and upward on the other side wall, and discharging into the top of said receiver, said receiver having an inlet communicating with the capillary tube at the lower portion of said receiver, the refrigerant level extending at all times to the top of said vertical portion of said receiver, the said evaporator tubing below the level of said liquid refrigerant in said receiver being flooded at all times and ready to cause immediate circulation and refrigeration upon starting of the motor compressor, the refrigerant boiling upward in said continuous tubing, and the head of refrigerant in said receiver promoting circulation, the said motor compressor having a motor housing provided with an oil sump surrounding the compressor, and provided with a charge of mineral oil in which the refrigerant is miscible, and the charge of refrigerant being sufficient at low ambient temperatures to fill the vertical portion of said receiver with liquid refrigerant, the refrigerant being driven out of the oil at higher ambient temperatures, and the excess refrigerant being accumulated in the upper horizontal part of said receiver, with a minimum change in the liquid head in said receiver.

7. A refrigeration system comprising an insulated cabinet having an outer shell, an inner liner, and a door opening closed by an insulated door, a substantially U-shaped evaporator carried by the top wall of said liner, said evaporator comprising an integral pair of side walls joined by a bottom wall, said side walls being trapezoidal in shape and longer at their rear edges, thereby causing the bottom wall to slope rearwardly, said evaporator having a rear wall provided with drain apertures above the bottom level, a motor compressor, condenser, and capillary restrictor, a receiver comprising an enlarged tubular member having an angular bend, forming an upper substantially horizontal portion and a lower substantially vertical portion, said upper portion having a suction tube connected to said compressor, a continuous length of evaporator tubing connected to the lower outlet of said vertical portion and extending sinuously underneath the bottom of said evaporator, upward on one side wall and upward on the other side wall, and discharging into the top of said receiver, said receiver having an inlet communicating with the capillary tube at the lower portion of said receiver, the refrigerant level extending at all times to the top of said vertical portion of said receiver, the said evaporator tubing below the level of said liquid refrigerant in said receiver being flooded at all times and ready to cause immediate circulation and refrigeration upon a starting of the motor compressor, the refrigerant boiling upward in said continuous tubing, and the head of refrigerant in said receiver promoting circulation, the said continuous tubing extending from one side of said evaporator sinuously underneath a shelf, and thereafter extending upwardly on the other wall of said evaporator.

8. A refrigeration system comprising an insulated cabinet having an outer shell, an inner liner, and a door opening closed by an insulated door, a substantially U-shaped evaporator carried by the top wall of said liner, said evaporator comprising an integral pair of side walls joined by a bottom wall, said side walls being trapezoidal in shape and longer at their rear edges, thereby causing the bottom wall to slope rearwardly, said evaporator having a rear wall provided with drain apertures above the bottom level, a motor compressor, condenser, and capillary restrictor, a receiver comprising an enlarged tubular member having an angular bend, forming an upper substantially horizontal portion and a lower substantially vertical portion, said upper portion having a suction tube connected to said compressor, a continuous length of evaporator tubing connected to the lower outlet of said vertical portion and extending sinuously underneath the bottom of said evaporator, upward on one side wall and upward on the other side wall, and discharging into the top of said receiver, said receiver having an inlet communicating with the capillary tube at the lower portion of said receiver, the refrigerant level extending at all times to the top of said vertical portion of said receiver, the said evaporator tubing below the level of said liquid refrigerant in said receiver being flooded at all times and ready to cause immediate circulation and refrigeration upon starting of the motor compressor, the refrigerant boiling upward in said continuous tubing, and the head of refrigerant in said receiver promoting circulation, and an electric heater clamped in heat conducting contact with said tubing on the bottom of said evaporator, for effecting a quick defrosting, the heater causing the refrigerant to boil upward through the tubing from the bottom of said evaporator, and the receiver supplying additional refrigerant under head, for causing circulation in one direction downward through the receiver and upward through the tubing.

9. A refrigeration system comprising an insulated cabinet having an outer shell, an inner liner, and a door opening closed by an insulated door, a substantially U-shaped evaporator carried by the top wall of said liner, said evaporator comprising an integral pair of side walls joined by a bottom wall, said side walls being trapezoidal in shape and longer at their rear edges, thereby causing the bottom wall to slope rearwardly, said evaporator having a rear wall provided with drain apertures above the bottom level, a motor compressor, condenser, and capillary restrictor, a receiver comprising an enlarged tubular member having an angular bend, forming an upper substantially horizontal portion and a lower substantially vertical portion, said upper portion having a suction tube connected to said compressor, a continuous length of evaporator tubing connected to the lower outlet of said vertical portion and extending sinuously underneath the bottom of said evaporator, upward on one side wall and upward on the other side wall, and discharging into the top of said receiver, said receiver having an inlet communicating with the capillary tube at the lower portion of said receiver, the refrigerant level extending at all times to the top of said vertical portion of said receiver, the said evaporator tubing below the level of said liquid refrigerant in said receiver being flooded at all times and ready to cause immediate circulation and refrigeration upon starting of the motor compressor, the refrigerant boiling upward in said continuous tubing, and the head of refrigerant in said receiver promoting circulation, and an electric heater clamped in heat conducting contact with said tubing on the bottom of said evaporator, for effecting a quick defrosting, the heater causing the refrigerant to boil upward through the tubing from the bottom of said evaporator, and the receiver supplying additional refrigerant under head, for causing circulation in one direction downward through the receiver and upward through the tubing, said electric heater being provided with an electric fuse connected to said heater in the circuit thereof, and said fuse being clamped to the heater to be melted due to excessive temperature at that point, in the event there is insufficient refrigerant to carry the heat away from said heater to the other parts of said evaporator.

10. A defrosting evaporator comprising a U-shaped metal member provided with side walls, bottom shelf, and rear wall, the said rear wall carrying an enlarged tubular receiver extending upwardly below the shelf and horizontally above the shelf, a pair of continuous coils of tubing extending sinuously across the bottom to form two parallel circuits, the said tubing thereafter extending upwardly on each side of the evaporator and sinuously across said shelf to the middle of said shelf, where both parallel circuits are connected to said receiver, the said receiver having a depending outlet from its lower end, connecting to both parallel circuits of tubing, and the said receiver having a suction outlet at its upper end and a capillary inlet for supplying refrigerant to said coils substantially at the lower end of said receiver.

11. A defrosting evaporator comprising, a substantially U-shaped metal member having a pair of trapezoidal side walls joined by a bottom wall, said side walls being longer at the rear edge than the front edge, brackets carried by said side walls for securement of the evaporator to a substantially level inner liner, the bottom wall sloping toward the rear for drainage, and a rear wall having forwardly extending attaching flanges secured to the side walls and having drainage apertures located just above the bottom wall, the said evaporator having a shelf for ice trays extending from wall to wall and secured to the side walls by downwardly extending attaching flanges, a receiver carried outside said rear wall, said receiver comprising an enlarged elongated tubular member having a vertically extending portion, an easy bend and a substantially horizontally extending portion at its upper end, said receiver having a liquid outlet at its lower end and an upwardly turned suction tube extending into its upper end, and a continuous length of evaporator tubing carried by said evaporator and comprising a substantially U-shaped length of tubing carried by one side wall above said shelf and communicating at its upper end with the upper portion of said receiver, said U-shaped tubing communicating with one end of a plurality of sinuous bends of tubing located on the bottom of said shelf and extending from said shelf sinuously downward on the other side of said evaporator below said shelf and thereafter being arranged sinuously on the bottom of said evaporator, and connected to the liquid outlet of said receiver.

12. A defrosting evaporator comprising, a substantially U-shaped metal member having a pair of trapezoidal side walls joined by a bottom wall, said side walls being longer at the rear edge than the front edge, brackets carried by said side walls for securement of the evaporator to a substantially level inner liner, the bottom wall sloping toward the rear for drainage, and a rear wall having forwardly extending attaching flanges secured to the side walls and having drainage apertures located just above the bottom wall, the said evaporator having a shelf for ice trays extending from wall to wall and secured to the side walls by downwardly extending attaching flanges, a receiver carried outside said rear wall, said receiver comprising an enlarged elongated tubular member having a vertically extending portion, an easy bend and a substantially horizontally extending portion at its upper end, said receiver having a liquid outlet at its lower end and an upwardly turned suction tube extending into its upper end, and a continuous length of evaporator tubing carried by said evaporator and comprising a substantially U-shaped length of tubing carried by one side wall above said shelf and communicating at its upper end with the upper portion of said receiver, said U-shaped tubing communicating with one end of a plurality of sinuous bends of tubing located on the bottom of said shelf and extending from said shelf sinuously downward on the other side of said evaporator below said shelf and thereafter being arranged sinuously on the bottom of said evaporator, and connected to the liquid outlet of said receiver, the said sinuous coils on the bottom of said evaporator extending from one side to the other, forming a plurality of straight passes and the rearmost of said straight passes having an electric heater clamped in heat conducting relation with said latter pass for causing the refrigerant to boil upward through the tubing to the top of the evaporator, the liquid refrigerant passing down to said tubing from said receiver.

13. A defrosting evaporator comprising, a substantially U-shaped metal member having a pair if trapezoidal side walls joined by a bottom wall, said side walls being longer at the rear edge than the front edge, brackets carried by said side walls for securement of the evaporator to a substantially level inner liner, the bottom wall sloping toward the rear for drainage, and a rear wall having forwardly extending attaching flanges secured to the side walls and having drainage apertures located just above the bottom wall, the said evaporator having a shelf for ice trays extending from wall to wall and secured to the side walls by downwardly extending attaching flanges, a receiver carried outside said rear wall, said receiver comprising an enlarged elongated tubular member having a vertically extending portion, an easy bend and a substantially horizontally extending portion at its upper end, said receiver having a liquid outlet at its lower end and an upwardly turned suction tube extending into its upper end, and a continuous length of evaporator tubing carried by said evaporator and comprising a substantially U-shaped length of tubing carried by one side wall above said shelf and communicating at its upper end with the upper portion of said receiver, said U-shaped tubing communicating with one end of a plurality of sinuous bends of tubing located on the bottom of said shelf and extending from said shelf sinuously downward on the other side of said evaporator below said shelf and thereafter being arranged sinuously on the bottom of said evaporator, and connected to the liquid outlet of said receiver, the said sinuous coils on the bottom of said evaporator extending from one side to the other, forming a plurality of straight passes and the rearmost of said straight passes having an electric heater clamped in heat conducting relation with said latter pass for causing the refrigerant to boil upward through the tubing to the top of the evaporator, the liquid refrigerant passing down to said tubing from said receiver, the said tubing extending to the liquid outlet of said receiver having a depending portion passing below said heater and forming a liquid trap.

14. A defrosting evaporator comprising, a substantially U-shaped metal member having a pair of trapezoidal side walls joined by a bottom wall, said side walls being longer at the rear edge than the front edge, brackets carried by said side walls for securement of the evaporator to a substantially level inner liner, the bottom wall sloping toward the rear for drainage, and a rear wall having forwardly extending attaching flanges secured to the side walls and having drainage apertures located just above the bottom wall, the said evaporator having a shelf for ice trays extending from wall to wall and secured to the side walls by downwardly extending attaching flanges, a receiver carried outside said rear wall, said receiver comprising an enlarged elongated tubular member having a vertically extending portion, an easy bend and a substantially horizontally extending portion at its upper end, said receiver having a liquid outlet at its lower end and an upwardly turned suction tube extending into its upper end, and a continuous length of evaporator tubing carried by said evaporator and comprising a substantially U-shaped length of tubing carried by one side wall above said shelf and communicating at its upper end with the upper portion of said receiver, said U-shaped tubing communicating with one end of a plurality of sinuous bends of tubing located on the bottom of said shelf and extending from said shelf sinuously downward on the other side of said evaporator below said shelf and thereafter being arranged sinuously on the bottom of said evaporator, and connected to the liquid outlet of said receiver, and a capillary inlet extending into said receiver at its vertical portion and downwardly turned toward its liquid outlet.

15. A defrosting evaporator comprising, a substantially U-shaped metal member having a pair of trapezoidal side walls joined by a bottom wall, said side walls being longer at the rear edge than the front edge, brackets carried by said side walls for securement of the evaporator to a substantially level inner liner, the bottom wall sloping toward the rear for drainage, and a rear wall having forwardly extending attaching flanges secured to the side walls and having drainage apertures located just above the bottom wall, the said evaporator having a shelf for ice trays extending from wall to wall and secured to the side walls by downwardly extending attaching flanges, a receiver carried outside said rear wall, said receiver comprising an enlarged elongated tubular member having a vertically extending portion, an easy bend and a substantially horizontally extending portion at its upper end, said receiver having a liquid outlet at its lower end and an upwardly turned suction tube extending into its upper end, and a continuous length of evaporator tubing carried by said evaporator and comprising a substantially U-shaped length of tubing carried by one side wall above said shelf and communicating at its upper end with the upper portion of said receiver, said U-shaped tubing communicating with one end of a plurality of sinuous bends of tubing located on the bottom of said shelf and extending from said shelf sinuously downward on the other side of said evaporator below said shelf and thereafter being arranged sinuously on the bottom of said evaporator, and connected to the liquid outlet of said receiver, and a capillary inlet extending into said receiver at its vertical portion and downwardly turned toward its liquid outlet, the said capillary inlet being provided with a nozzle pointing toward said liquid outlet for stimulating liquid refrigerant circulation downward out of said receiver.

16. In a household refrigerator, the combination of an insulated cabinet having an outer shell and an inner liner separated by insulation, said liner supporting at its upper end a substantially U-shaped evaporator, plastic molded guides carried by said liner on each liner wall extending from front to back below said evaporator, each of said guides having a pair of guide flanges for supporting a drip tray, and each of said guides having through apertures for passing air, said guides having depending front and rear flanges provided with apertures and an insulating shaft carrying a louver located in said apertures in each guide, said shaft having a forward handle outside said flanges for manipulation of said louver, and the forward flanges being provided with indicia for indicating open and closed position of said louver, and a molded plastic, heat insulating combined drip tray and air baffle formed with upwardly projecting border flanges, and a rear drain aperture, and having the inner surfaces of its bottom draining toward said aperture, said tray being slidably mounted in said guides and substantially closing the space below the evaporator from guide to guide.

17. In a household refrigerator, the combination of an insulated cabinet having an outer shell and an inner liner separated by insulation, said liner supporting at its upper end a substantially U-shaped evaporator, plastic molded guides carried by said liner on each liner wall extending from front to back below said evaporator, each of said guides having a pair of guide flanges for supporting a drip tray, and each of said guides having through apertures for passing air, said guides having depending front and rear flanges provided with apertures and an insulating shaft carrying a louver located in said apertures in each guide, said shaft having a forward handle outside said flanges for manipulation of said louver, and the forward flanges being provided with indicia for indicating open and closed position of said louver, and a molded plastic, heat insulating combined drip tray and air baffle formed with upwardly projecting border flanges, and a rear drain aperture, and having the inner surfaces of its bottom draining toward said aperture, said tray being slidably mounted in said guides and substantially closing the space below the evaporator from guide to guide, the said drip tray being provided with depending drawer guides, and a drip container comprising a drawer slidably mounted in said latter guides and having an end portion thereof disposed below said drain aperture for receiving condensate from the drip tray.

18. In a household refrigerator, the combination of an insulated cabinet having an outer shell and an inner liner separated by insulation, said liner supporting at its upper end a substantially U-shaped evaporator, plastic molded guides carried by said liner on each liner wall extending from front to back below said evaporator, each of said guides having a pair of guide flanges for supporting a drip tray, and each of said guides having through apertures for passing air, said guides having depending front and rear flanges provided with apertures and an insulating shaft carrying a louver located in said apertures in each guide, said shaft having a forward handle outside said flanges for manipulation of said louver, and the forward flanges being provided with indicia for indicating open and closed position of said louver, and a molded plastic, heat insulating combined drip tray and air baffle formed with upwardly projecting border flanges, and a rear drain aperture, and having the inner surfaces of its bottom draining toward said aperture, said tray being slidably mounted in said guides and substantially closing the space below the evaporator from guide to guide, the said drip tray being provided with depending drawer guides, and a drip container comprising a drawer slidably mounted in said latter guides and having an end portion thereof disposed below said drain aperture for receiving condensate from the drip tray, the said liner supporting an inwardly curved drip baffle on its rear liner wall below said evaporator and extending over the rear edge of said drip tray.

19. A defrosting evaporator comprising a sheet metal housing having bottom wall, side walls, and rear wall, a second wall parallel to the bottom wall, a receiver carried by the rear wall, and having a suction outlet tubing extending into the upper end of said receiver, a continuous run of tubing extending sinuously across said parallel wall down the side walls and across the bottom wall and up the other side wall, returning to an upper part of said receiver, and an electric heater carried by said evaporator in heat exchange relation with a part of said continuous tubing on said bottom wall, the tubing on said bottom wall being connected to a lower refrigerant outlet of said receiver, and an inlet tube extending into said receiver, and having a nozzle end pointing toward said refrigerant outlet, which extends from the receiver to the tubing on the bottom wall, the said nozzle promoting ebullition in said receiver, and the heated refrigerant circulating through said sinuous tubing across the bottom of said evaporator and up the sides of said evaporator and back to a top portion of said receiver.

20. A defrosting evaporator comprising a sheet metal housing having bottom wall, side walls, and rear wall, a second wall parallel to the bottom wall, a receiver carried by the rear wall, and having a suction outlet tubing extending into the upper end of said receiver, a continuous run of tubing extending sinuously across said parallel wall down the side walls and across the bottom wall and up the other side wall, returning to an upper part of said receiver, and an electric heater carried by said evaporator in heat exchange relation with a part of said continuous tubing on said bottom wall, the tubing on said bottom wall being connected to a lower refrigerant outlet of said receiver, and an inlet tube extending into said receiver, and having a nozzle end pointing toward said refrigerant outlet, which extends from the receiver to the tubing on the bottom wall, the said nozzle promoting ebullition in said receiver, and the heated refrigerant circulating through said sinuous tubing across the bottom of said evaporator and up the sides of said evaporator and back to a top portion of said receiver, the said sinuous formations of tubing on the side walls sloping upward, and said evaporator having an electric heater in heat conducting relation with the side wall tubing on each side of said evaporator, for promoting upward circulation in the side wall tubing.

21. A defrosting evaporator comprising a box-like metal member provided with upper and lower walls, side walls, and a rear wall, the said rear wall carrying an enlarged tubular receiver extending downwardly at its lower end and extending horizontally at its upper end, a continuous coil of tubing extending sinuously across the lower wall of said evaporator to form two parallel circuits, the said tubing extending thereafter upwardly on each side of the evaporator and sinuously across the upper wall toward the middle of said upper wall, where both parallel circuits are connected to said receiver, the said receiver having a depending outlet from its lower end connected to both parallel circuits of tubing, and the said receiver having a suction outlet at its upper end, and an inlet tube extending into said receiver adjacent its lower end, and having a downwardly turned nozzle pointing toward the outlet from said receiver for promoting circulation and ebullition of the refrigerant in said receiver.

22. A defrosting evaporator comprising a box-like metal member of sheet metal having a pair of side walls joined by a bottom wall, and having a rear wall, the said side walls being longer vertically at their rear edges and tapering gradually to a shorter, vertical length at their forward edges, a liner having a level upper wall, brackets carried by said liner and said side walls for securing the evaporator with its upper edges in substantially level position, the bottom wall sloping toward the rear for drainage, and the rear wall having drainage apertures located just above the bottom wall for draining the condensate out of the rear side of said evaporator.

References Cited in the file of this patent

UNITED STATES PATENTS

| | | |
|---|---|---|
| 2,292,015 | Schweller | Aug. 4, 1942 |
| 2,510,758 | Rundell | June 6, 1950 |
| 2,657,544 | Mather | Nov. 3, 1953 |
| 2,665,567 | King et al. | Jan. 12, 1954 |
| 2,687,023 | Herndon | Aug. 24, 1954 |
| 2,689,110 | Strickland | Sept. 14, 1954 |